United States Patent [19]
Gillies et al.

[11] Patent Number: 5,943,499
[45] Date of Patent: Aug. 24, 1999

[54] SYSTEM AND METHOD FOR SOLVING GENERAL GLOBAL DATA FLOW PREDICATED CODE PROBLEMS

[75] Inventors: David M. Gillies, Cupertino; Dz-ching Ju, Sunnyvale, both of Calif.

[73] Assignee: Hewlett-Packard Company, Palto Alto, Calif.

[21] Appl. No.: 08/757,539

[22] Filed: Nov. 27, 1996

[51] Int. Cl.[6] .............................. G06F 12/00; G06F 13/00
[52] U.S. Cl. ................. 395/709; 395/707; 395/183.13; 395/183.14
[58] Field of Search ............................... 395/377, 183.01, 395/183.13, 183.14, 392, 701, 705, 707–710, 800.23, 500; 711/167, 147, 149, 169

[56] References Cited

U.S. PATENT DOCUMENTS

| | | | |
|---|---|---|---|
| 5,239,663 | 8/1993 | Faudemay et al. | 707/3 |
| 5,649,135 | 7/1997 | Pechanek et al. | 395/376 |
| 5,650,936 | 7/1997 | Loucks et al. | 364/483 |
| 5,652,835 | 7/1997 | Miller | 395/183.14 |
| 5,694,577 | 12/1997 | Kiyohara et al. | 711/167 |
| 5,696,956 | 12/1997 | Razdan et al. | 395/800.23 |

OTHER PUBLICATIONS

Alexandre E. Eichenberger and Edward S. Davidson, "Register Allocation for Predicated Code," In Proc. of the 28th Annual International Symposium on Microarchitecture, Nov. 1995.

Alfred B. Aho, Ravi Sethi, Jeffery D. Ullman, *Compilers—Principals, Techniques and Tools*, 2nd Edition, pp. 624–633, Addison Wesley, 1988.

*Primary Examiner*—James P. Trammell
*Assistant Examiner*—Cuong H. Nguyen

[57] ABSTRACT

The relationships among predicates can be analyzed over the scope of an entire procedure. The system scans a block of predicated code and collects a set of predicates used in the code to form a basis set. The system then allocates a bit-vector for each predicate in the basis set to form a live set. Each bit-vector represent a liveness of each predicate. The system then builds an interference graph that symbolizes interferences between registers during allocation of registers.

29 Claims, 4 Drawing Sheets

```
AssertLiveUnderPredicate(x, qp) {
    let A = {p in the basis | x is live under p}
    // Already live
    if qp is a member of A return
    // Minimize the liveness information
    B = leastUpperBoundSum(qp, A)
    mark x as dead under all predicates in
        the basis
    for each element r in B {
        if r is in the basis
            // Add x to the LiveSet
            liveSet[r] += x
        else
            for each element s in the basis
                if (!isDisjoint(r,s))
                    // Approximation
                    liveSet[s] += x
    }
}
```

10

```
AssertDeadUnderPredicate(x, qp) {
    let A = {p in the basis | x is live under p}
    if qp is an element of A {
        // Remove x from the liveSet
        liveSet[qp] -= x
        return
    }
    // Call to predicate analysis
    B = leastUpperBoundDiff(qp, A)
    mark x as dead under all predicates in the basis
    for each element r in B
        if r is in the basis
            // Add x to the liveSet
            liveSet[r] += x
        else
            for each element s in the basis
                if (!isDisjoint(r,s))
                    liveSet[s] += x    //Approximation
}
```

10

FIG. 4
```
AssertDeadUnderPredicate(x, qp) {
    let A = {p in the basis | x is live under p}
    if qp is an element of A {
        // Remove x from the liveSet
        liveSet[qp]-=x
        return
    }
    // Call to predicate analysis
    B = leastUpperBoundDiff(qp, A)
    mark x as dead under all predicates in the basis
    for each element r in B
        if r is in the basis
            // Add x to the liveSet
            liveSet[r]+=x
        else
            for each element s in the basis
                if (!isDisjoint(r,s))
                    liveSet[s]+=x    //Approximation
}
```

FIG. 5
```
AllCurrentlyLive(qp) {
    S = {}
    for each p in the basis
        If (!isDisjoint(p, qp))
            S += liveSet[p]  // Set union
    return S
}
```

FIG. 6
```
BuildInterferenceGraph() {
    for each basic block bb in the program {
        // work is a LiveSet
        work = dataflowLiveOut[bb]
        for each instruction inst in bb in
        backward order {
            qp = inst.qualifyingPredicate()
            if (qp == P0) qp = bb.homePredicate()
            S = work.AllCurrentlyLive(qp)
            for each def d in inst
                interfere(d, S) // Add edge to d from set S
            for each def d in inst
                work.AssertDeadUnderPredicate(d, qp)
            for each use u in inst
                work.AssertLiveUnderPredicate(u, qp)
        }
    }
}
```

FIG. 7

```
RegionSelection() {
    for each interval I in the procedure
        in depth-first order {
        A = {}
        for each GSR R in I {
            B = {basis for R}
            if |A+B| <= LIMIT {
                mark R as merged
                A += B
            }
        }
        for each direct descendent interval J of I {
            C = {basis of J}
            if | A+C | <= LIMIT {
                mark J as merged
                A += C
            }
        }
        set the basis of I and all merged GSR's
            and intervals to A
    }
}
```

FIG. 8

```
LiveSetUnion(Target, Source) {
    if (Target.tag == Source.tag)
        for i = 0 to Target.setCount-1
            // Set union
            Target.liveSet[i] += Source.liveSet[i]
    else
        // Conservative
        Target.liveSet[p0] +=
                Source.AllCurrentlyLive(p0)
}
```

FIG. 9

```
LiveSetIntersection(Target, Source) {
    for each basis element t of Target {
        temp = {}
            for each basis element s of Source {
                if (!IsDisjoint(t,s) {
                    // Standard Set Union
                    temp += Source[s];
                }
            // Standard Set Intersection
            Target[t] &= temp;
    }
}
```

FIG. 10

```
LiveSetDifference(Target, Source) {
    if (Target.tag == Source.tag)
        for each basis element s of Source {
            for each variable x in Source[s] {
                Target.assertDeadUnderPredicate(x,s);
            }
        }
    else
    {
        //Approximation
        Target[p0]-=Source[p0];
    }
}
```

FIG. 11

```
LiveSetComplement(Target) {
    temp = {}
    temp[p0] = Target.allCurrentlyLive(p0);
    LiveSetDifference(temp, Target);
    Target = temp;
}
```

FIG. 12

SYSTEM AND METHOD FOR SOLVING GENERAL GLOBAL DATA FLOW PREDICATED CODE PROBLEMS

TECHNICAL FIELD OF THE INVENTION

This invention relates to the use of predicated code in high performance microprocessors and more particularly, to such use in a system and method for solving general global data flow problems in the presence of predicated code.

BACKGROUND OF THE INVENTION

To fully utilize the wide machine resources in modern high-performance microprocessors, it is necessary to exploit parallelism beyond individual basic blocks. Architectural support for predicated execution increases the degree of instruction level parallelism by allowing instructions from different basic blocks to be converted to straight-line code guarded to boolean predicates. However, predicated execution also presents significant challenges to an optimizing compiler.

The use of data flow techniques is well-known in situations not involving predicated code. For example, Section 101b of the book *Compilers: Principles, Techniques, and Tools* by Alfred V. Aho, Ravi Sethi and Jeffrey D. Ullman, which is hereby incorporated by reference herein, beginning on page 624 describes such control techniques. The solution presented in the above-described reference, however, do not solve the problems inherent within predicated code environments.

VLIW (Very Long Instruction Word) and superscalar architectures can exploit significant amounts of instruction level parallelism (ILP) to achieve improved performance in application programs. Parallelism within individual basic blocks are generally insufficient to fully utilize wide machine resources. Predicated execution, as shown in P. Y. Hsu and E. S. Davidson, "Highly Concurrent Scalar Processing," In Proc. of the 13th Annual Int'l Symp. on Computer Architecture, pp. 386–395, June 1986; and V. Kathail, M. Schlansker, B. Rau, *HPL Playdoh Architecture Specification: Version* 1.0, Hewlett-Packard Laboratories Technical Report, HPL-93-80, February 1993, both of which are hereby incorporated by reference herein is an architectural model designed to exploit parallelism across basic blocks. In such a model, instructions from different basic blocks are converted to straight-live code guarded by boolean predicates. Architectural support for predicated execution varies from general support for predication in the conditional skip instructions, to conditional nullify instructions, and conditional move instructions.

In a general predicated execution model, the execution of an instruction is guarded by a boolean qualifying predicate. Each qualifying predicate can be regarded as a 1-bit predicate register. An example of a predicated instruction is:

$x = y + z$ if $p$ where p is the qualifying predicate which controls whether the instruction executes and updates the architectural state. To explore predication, a compiler generally incorporates a technique called if-conversion, which eliminates branch instructions and converts affected instructions to appropriate predicated forms. If-conversion effectively converts control flow into data flow, as discussed by J. R. Allen, K. Kennedy, C. Portfield, and J. Warren, "Conversion of Control Dependence to Data Dependence," In Conf. Record of the 10th Annual ACM Symp. on Principles of Programming Languages, pp. 177–189, January 1983.

However, in order to achieve these benefits, predication presents a challenge to many conventional analysis and transformation phases performed in an optimizing compiler. For example, consider the code shown in (1) below:

(1)

S1: p,q = cmpp.un.uc(a<b)  if true
S2: x = ..                  if p
S3: y = ..                  if q
S4: ..= x                   if p
S5: ..= y                   if q The cmpp instruction sets p true and q false if the condition (a<b) is true and reverses these values if the condition is false. (The details of the architectural model will be described in the Detailed Description.) Variable x is defined and used under p and variable y is defined and used under q. A conventional live range analysis would find the live range of x from S2 to S4 and the live range of y from S3 to S5. Based on this analysis, a traditional register allocator would conclude that x and y interfere with each other and subsequently assign different physical registers to them. However, since p and q are complementary, x and y will never hold valid values at the same time and thus they can share the same physical register.

One solution for working with predicated code is discussed in a paper entitled *Register Allocation for Predicated Code*, presented at the 28th Annual Int'l Symp. on Microarchitecture in November of 1995, by Alexandre Eichenberger and Edward Davidson. The Eichenberger/Davidson article describes a technique which uses a method of tracking a live variable within a single hyper-block. This technique is local to a single hyper-block and is not global in nature. In addition, only the live variable problem is solved and the complex nature of any implementation in a system makes the proposed solution not very practical for commercial use.

Prior compilers used a predicate hierarchy graph (PHG) to track the boolean equations for all of the predicates in a hyperblock. This is shown in S. A. Mahike, D. C. Lin, W. Y Chen, R. E. Hank, and R. A. Bringmann, "Effective Compiler Support for Predicated Execution Using Hyperblock," In Proc. of the 25th Annual Int'l Symp. on Microarchitecture, pp. 45–54, December 1992. In *Mahike*, et al., predicate analysis occurs over the scope of a hyperblock and does not extend globally. When a companion data structure, like PHG, is maintained with the code, then it may require updating whenever the program is transformed.

There is proposed by N. J. Waters, S. A. Mahike, W.-M. W. Hwu, and B. R. Rau, "Reverse If-conversion," In Proc. of the SIGPLAN'93 Conf. on Programming Language Design and Implementation, pp. 290–299, June 1993, a reverse if-conversion scheme to map predicates from the data flow domain back to the more familiar control flow domain. A major drawback of this approach is that during the remapping process some originally non-existent control paths may be created. This typically occurs when code is if-converted and then scheduled, thus permuted the order of the code. When this code is reverse if-converted, non-existent paths may cause conservative treatment in many analyses and transformations.

Alexandre E. Eichenberger and Edward S. Davidson, as discussed in their paper, "Register Allocation for Predicated Code," In Proc. of the 28th Annual Int'l Symp. on Microarchitecture, November 1995, solves a register allocation problem in the presence of predication by representing predicates as P-facts—logically invariant expressions.

The mechanism concludes that two live ranges do not interfere if the intersection of the two sets of P-facts can be simplified to false using a symbolic package. This approach is also restricted to the scope of a hyperblock, and may have limited practicality given the potential exponential compilation time behavior with respect to the number of predicates.

The problem of global register allocation is well known. See, for example, Preston Briggs, *Register Allocation via Graph Coloring*, Ph.D Thesis, TR92-183, Rice University, 1992; Gregory J. Chaitin, *Register Allocation and Spilling via Graph Coloring*, SIGPLAN Notices 17(6):98–105, June, 1982. Proc. of the ACM SIGPLAN'82 Symp. on Compiler Construction; and Fred C. Chow and John L. Hennessy, *The Priority-Based Coloring Approach to Register Allocation*, ACM Trans. on Programming Languages and Systems, 12(4):501–536, October, 1990. Using these approaches, good heuristic approximations have been developed to solve the problem.

However, predication creates new challenges for the established techniques. In the quest for greater instruction level parallelism through predication, many register live ranges are created which, with current analysis techniques, will appear to overlap. Without applying knowledge of the relationships among predicates a large number of false interferences will arise. Our experiments show the register allocation will conservatively allocate far more registers than are necessary.

For example, in (2), there is illustrated the need for predicate-aware register allocation. This code sequence arises from if-conversion and simple list scheduling.

```
loop:                                      (2)
S1: p,q = cmpp.un.uc(a<b)   if true
S2: x = ...                 if p
S3: y = ...                 if q
S4: ... = x                 if p
S5: ... = y                 if q
S6: z = ...                 if true
S7: ... = z                 if true
S8: w = ...                 if true
S9: ... = w                 if true
Branch loop
```

As was pointed out in Section 1, without any knowledge of the relationship between p and q, these will be conservatively inferred that x and y interfere. Additionally, it is difficult to conclude that a predicated definition ends a live range.

Accordingly, one object of our invention is to provide a practical and efficient mechanism to improve data flow analysis and optimizations in the presence of predicated code.

It is a further object of our invention to provide a register allocation which benefits from understanding and utilizing the predicate relations.

It is a still further object of our invention to provide a means to construct an interference graph in the presence of predicated code.

It is a still further object of our invention to provide a means to efficiently solve the register allocation problem by limiting the scope of analysis to an arbitrary sub-region of the procedure.

It is a still further object of our invention to provide a means to infer the end of a live-range via a specialized register allocation sequence.

SUMMARY OF THE INVENTION

The foregoing problems and objections, as well as others, are solved by one embodiment of our system and method which allocate registers on a predicate aware basis. This awareness is driven by tracking all of the predicates. To achieve this, the system must know that the definition's qualifying predicate is a superset of all predicates under which it is currently live. In the example of (2) above, the live range of y begins at S5 but, without tracking all the predicates under which y is live, we cannot deduce that it is ended at S3. Conservative data flow analysis will then cause the live range for y to extend around the back-edge of the loop to interfere with w at S8 and z at S6. This originally short live range now interferes with every other live range defined in the loop. If the number of live ranges within a loop body of this type is greater than n, where n is the number of registers available on the target machine, spilling must occur. This example is presented in terms of liveness around the back-edge of a loop, but the same situation also occurs in straight-line code.

Application, Ser. No. 08/756,600, filed concurrently herewith, having a common assignee, entitled GLOBAL CONTROL FLOW TREATMENT OF PREDICATED CODE, is hereby incorporated by reference herein.

Application, Ser. No. 08/756,423, filed concurrently herewith, having a common assignee, entitled COMPILING A PREDICATED CODE WITH DIRECT ANALYSIS OF THE PREDICATED CODE, by Richard Johnson and Michael Schlansker, is hereby incorporated by reference herein. In particular, we are relying on the presence of the following functionalities.

IsDisjoint(p,q): asks whether the domain of predicate p overlaps with that of predicate q. Two predicates are disjoint if they can reach a common ancestor through different edges of the same partition. It is straightforward to extend this query to IsDisjoint(p,Q), where Q is a set of predicates, and the answer is true if p is disjoint from every predicate in Q.

LeastUpperBoundSum(p,Q): adds predicate p to a set of predicates, Q. The domain of the resultant set is the smallest superset of the union of the domain of p and the domain of Q. The resultant set is expected to be simplified in the way that if all of the child predicates in a partition appear in the union of p and Q, these child predicates are replaced with their parent predicate.

LeastUpperBoundDiff(p,Q): subtracts predicate p from a set of predicates, Q. The domain of the resultant set is the smallest superset of the domain of Q subtracted by the domain of p.

When predicates cannot be accurately analyzed, the spilling of predicated code must be handled carefully to ensure that the graph coloring algorithm terminates. That is, if we are not able to infer the end of a predicated live range x correctly then we cannot do so for x's predicated spill code either.

There are a great number of practical problems in performing register allocation for predicated code. The situation discussed herein enhances traditional global data flow analysis and interference graph construction to address these problems.

One aspect of our invention is to provide the extensions necessary to enhance a traditional register allocation scheme to build a predicate-aware interference graph for a single basic block using conservative data flow information.

Another aspect of our invention is to provide enhancements to the traditional global liveness data flow calculation, the procedure-wide interference graph construction and to enhance the benefit of using global scheduling regions as boundaries for predicated live range analysis.

Accordingly, one technical advantage of our invention is that the use and allocation of registers is reduced in accordance with a global awareness of the predicates allocated with the code.

It is a further technical advantage of our invention that the global predicates are known so as to define the live range of code segments for a given set of instructions.

It is a still further technical advantage of our invention that the system and method knows when it cannot infer the end of a predicated live range and terminates it with a special register allocation sequence.

The system and method of this invention can advantageously run on many well known computers (none of which are shown). One example, would be the PA-RISC 8200, available from Hewlett-Packard Company.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

System analysis and operation register allocations typically construct an interference graph by first calculating a bit-vector of all currently live registers at each point in the CFG. The bit-vector is initialized at the bottom of each basic block to all those registers which were computed to be live out by a previous pass of data flow analysis. The bit-vector is then propagated through the instruction stream to the top of the basic block. At each instruction an interference is recorded between each def and all elements of the bit-vector, then the defs are removed from the bit-vector and all uses added.

Our technique builds upon the standard bit-vector style interference graph construction algorithm. We first scan the basic block and collect the set of predicates used in the code stream and then augment the set with p0, the always true predicate. This set is termed the basis for analysis for the basic block or, more simply, the basis. We then allocate a bit-vector for each (predicate) element in the basis. This bit-vector represents liveness with respect to each of its basis elements. We call this data structure a LiveSet. We augment each LiveSet with an identifying basis tag to ease date flow propagation. In the absence of predicated code, this scheme reduces to the traditional unpredicated case, since the basis contains only p0, and a LiveSet is a single bit-vector.

Figure 2:
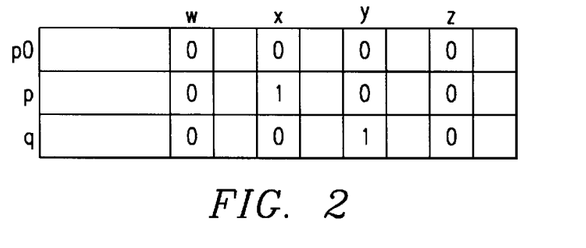
FIG. 2 shows an example of a live set.

FIG. 2 depicts the LiveSet for Example (2) after processing the instruction marked S4 in the backward traversal. Liveness is indicated by the bit value 1. This LiveSet represents the fact that x is live only under p, and y is live only under q at this point. At S3, y is defined under q. Since x is live under p, and p and q are disjoint, we discover there is no interference between x and y.

In the next few subsections, we will develop the machinery necessary to build the interference graph in the presence of predication. This machinery naturally extends from single basic blocks to arbitrary regions or entire procedures.

Figure 3:
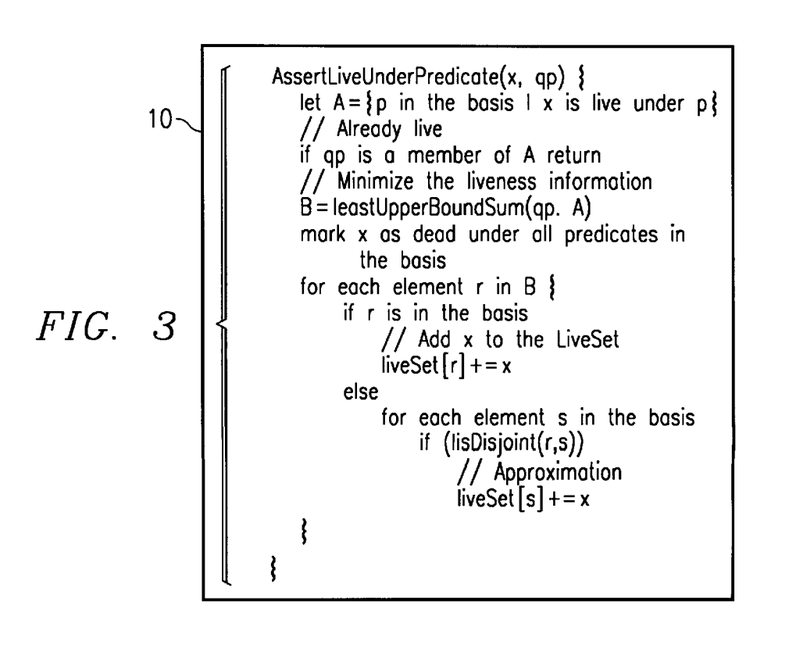
FIG. 3 shows an algorithm for asserting register liveliness.

AssertLiveUnderPredicate—For each register x used in an instruction, we will update liveness under the qualifying predicate qp. Instructions guarded by predicate true are treated as if they were predicated with the control predicate of the containing basic block. AssertLiveUnderPredicate is a function which asserts the liveness of a virtual register under a predicate. Pseudo code for this operation is shown in FIG. 3 operating in computer system 10. (For our embodiment, the pseudo code is written in an object-oriented manner: each method is assumed to be operating on a LiveSet). If x is already live under qp then no work is necessary. If x is not currently live under qp, then we compute a minimal set of predicates which encapsulate the liveness of x by a call to leastUpperBoundSum. This allows us to keep the underlying representation compact. In the event that the minimal set contains a predicate which is not part of the basis, we will conservatively update the liveness information to conform to the basis by checking disjointness with each basis element. This situation may arise due to the limiting the size of a basis.

Figure 4:
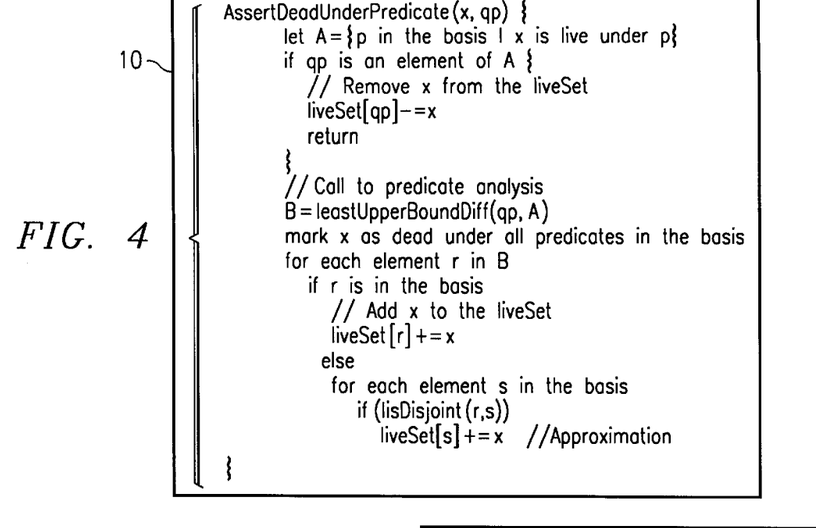
FIG. 4 shows an algorithm for recording register deadliness.

AssertDeadUnderPredicate—For each register x defined in an instruction, we will update deadness under the qualifying predicate qp. AssertDeadUnderPredicate is a function which asserts that a virtual register has gone dead under a predicate. The pseudo code for this operation is shown in FIG. 4 operating in computer system 10. We always minimize the number of basis elements required to represent the liveness of a variable. Therefore, if x is already live under qp, we simply remove liveness under qp and return.

Otherwise, we form a set of all predicates under which x is currently live and subtract qp from the set by using least-UpperBoundDiff to keep the number of predicates involved to a minimum. As is the case with AssertLiveUnderPredicate, some approximation may be introduced.

Figure 5:
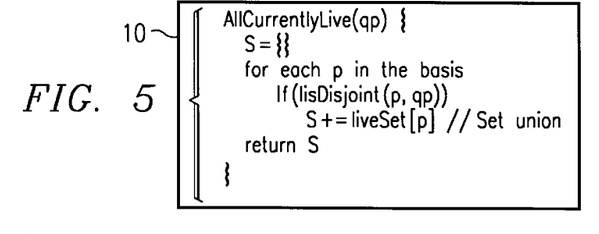
FIG. 5 shows an algorithm for producing a list of all registers live with respect to a given predicate.

AllCurrentlyLive—In order to compute interferences or conservatively conduct an analysis across basic block boundaries, we need to be able to produce a set of all registers which are currently live under a given predicate qp. For example, each def of an instruction interferes with the set of registers given by AllCurrentlyLive(qp), where qp is the qualifying predicate of the instruction. Data flow information can be propagated conservatively across basic blocks by use of AllCurrentlyLive(p0). The pseudo code for this operation is shown in FIG. 5 operating in computer system 10. AllCurrentlyLive computes a single bit-vector which is the union of all bit-vectors within a LiveSet whose basis element is not disjoint from qp.

Figure 6:
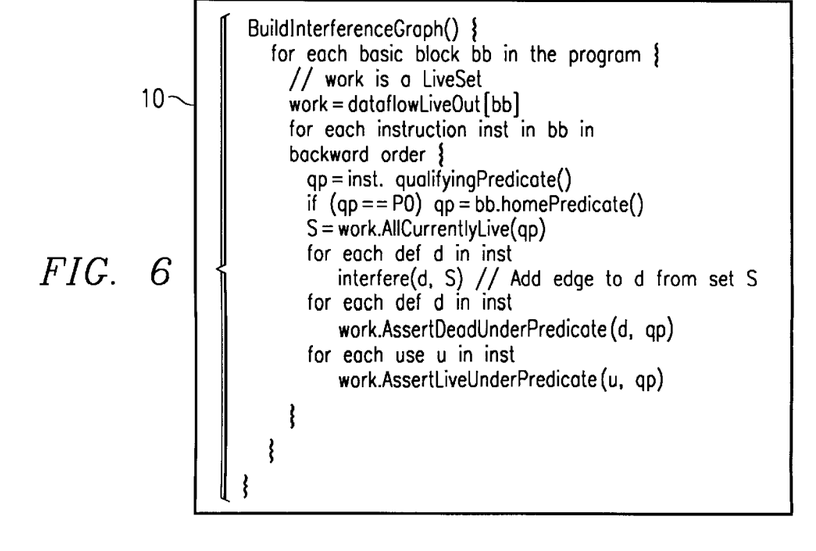
FIG. 6 shows an algorithm for building the predicate-aware interference graph.

Interference Graph Construction—The algorithm in FIG. 6 operating in computer system 10 controls how the interference graph is constructed in the presence of predicates. The method is quite similar to the traditional method of interference graph construction—it is simply augmented by the use of LiveSet's and the support routines described above. By controlling the widths of the LiveSet's, the runtime of this method is kept in harmony with compile speed requirements. In some cases the coloring algorithm as a whole can even be faster due to the simpler interference graph.

Global Analysis. The local framework allows for detailed analysis of single basic blocks and is sufficient to analyze Example (2). However, to obtain higher degrees of ILP, aggressive optimizations, such as global scheduling or trace scheduling must be employed to move instructions into ILP-poor basic blocks. We will now extend the local framework to a global framework. The scheduling techniques cited above generally restrict their region of analysis to sub-regions of CFG. Our approach recursively merges the bases of analysis of basic blocks within global scheduling regions (GSR's) to form a single common basis for data flow analysis.

Region Selection—Our approach is aimed at analyzing entire procedures. However, global analysis of predicated live ranges can be very expensive if limits are not placed on the algorithm. In practice, it may not be desirable to always analyze an entire procedure in an aggressive manner. We accommodate such cases by hierarchically building the regions of analysis from the most deeply nested portions of the CFG. This is, basis for several basic blocks are merged only if the size of the resulting basis does not exceed some limit. Our embodiment used 32 at the limit.

Good predication can be accomplished only with intimate familiarity with the underlying machine architecture. In our approach, we assume that most interesting predicated live ranges will be created by an if-converter and transported across basic blocks by a global instruction scheduler. Therefore, the scheduling regions used by a global scheduler will limit the scope of predicated code motion and hence the extent of predicated live ranges. Recursive motion between nested GSR's may also occur. The recursive nature of our region selection attempts to address this issue. Therefore, GSR's are a natural building block for basis construction for register allocation.

Figure 7:
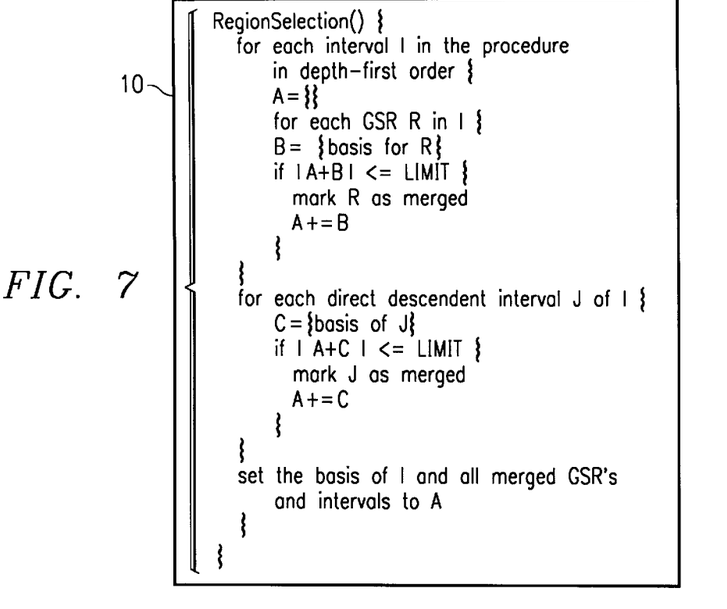
FIG. 7 shows an algorithm for selecting analysis regions.

While GSR's limit scheduling induced code motion and thus the length of live ranges, naturally occurring (e.g. programmer created) live ranges will span many GSR's. Limiting the scope of analysis strictly to GSR's is too conservative. We recursively build-up the basis, first by attempting to coalesce the basis of all GSR's within an interval, as discussed by T. Lengauer and R. E. Tajan, *A Fast Algorithm for Finding Dominators in a Flow Graph,* ACM Trans. on Prog. Languages and Systems, 1:1, pp 121–141, July 1979, and then coalescing the bases of inner intervals into a single basis of analysis. Intervals are coalesced in a depth-first traversal of the interval tree. In the best case, this recursive selection will result in the entire procedure being analyzed with a single basis. In the event that multiple regions are selected, data flow calculations can then be performed accurately within each region and summarized at region boundaries. FIG. 7 shows pseudo-code for the region selection process operating in computer system 10.

The basis used by each basic block in the program is recorded by tagging its LiveSet with a unique basis identifier. A bit-vector style data flow analysis can now be performed by extending traditional techniques.

Data Flow Transfer Functions—Standard bit-vector liveness calculation techniques can be used by extending the algorithm to use LiveSet's rather than simple bit-vectors. Some additional complication arises when propagating the information across basic block boundaries. To pass predicated liveness information across basic block boundaries we need two pieces of information about the source and target basic blocks:

1. The current liveness information.
2. The analysis basis used.

Figure 8:
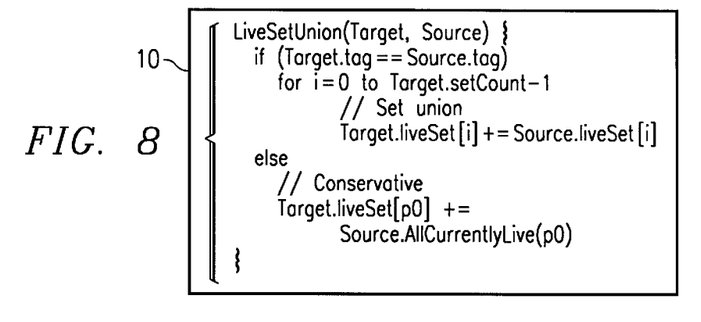
FIG. 8 shows an algorithm for computing the union of LiveSet's.
Figure 9:
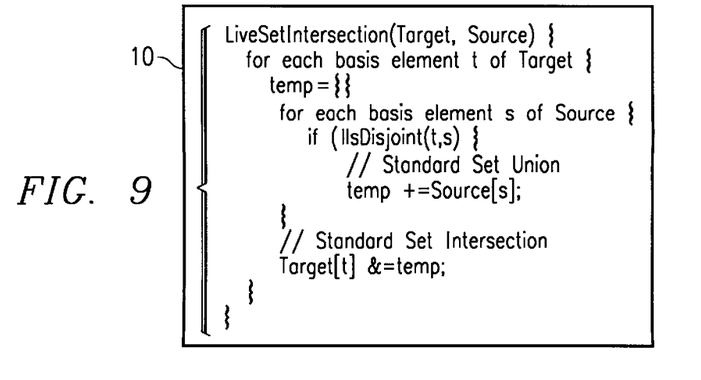
FIG. 9 shows an algorithm for computing the intersection of LiveSet's.
Figure 10:
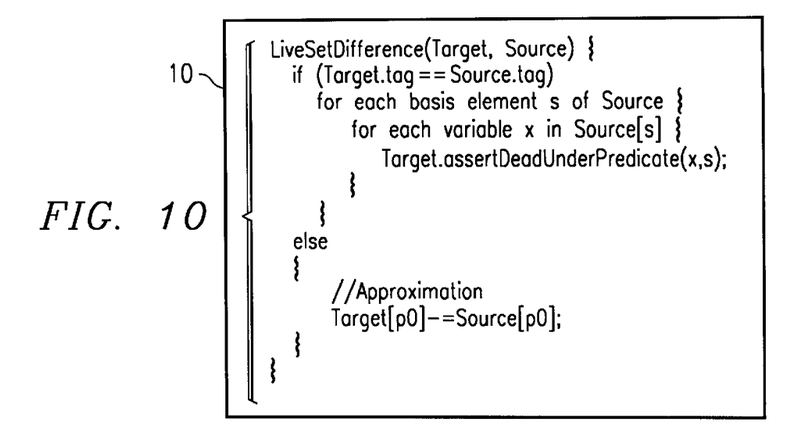
FIG. 10 shows an algorithm for computing the difference of LiveSet's.
Figure 11:
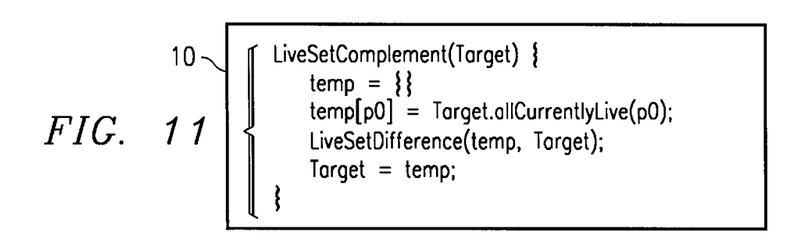
FIG. 11 shows an algorithm for computing the complement of LiveSet's.

Information to identify identical bases is kept with each LiveSet as its basis tag. The liveness information is contained in the bit-vectors of each LiveSet. If the two LiveSet's use the same basis then data flow information can be transferred without approximation. Conservative liveness information is used otherwise. FIG. 8 shows pseudo-code for a data flow LiveSet union operation. Any classical data flow problem can be solved in a predicate aware fashion by use of the functions depicted in FIGS. 8, 9, 10, and 11 operating in computer system 10.

Approximation. In some cases the predicate analysis may return an answer containing predicates outside of the present basis. This can arise from levels of nesting outside the current region or from asymmetries in the CFG requiring internal predicate nodes to be generated (e.g. a critical edge) to represent the missing symmetrical relationship. These cases are handled conservatively.

Secondly, the analysis of predicate relations ignores back edges. Consequently, we cannot accurately analyze predicated live ranges which are defined on one iteration of a loop and consumed on a subsequent iteration. We detect such live ranges and use conservative data flow information for them at look back edges.

Figure 1A:
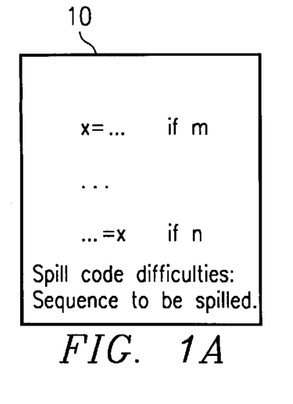
FIG. 1A illustrates a sequence to be spilled.
Figure 1B:
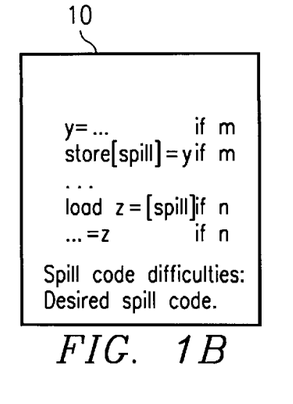
FIG. 1B illustrates a desired spill code.
Figure 1C:
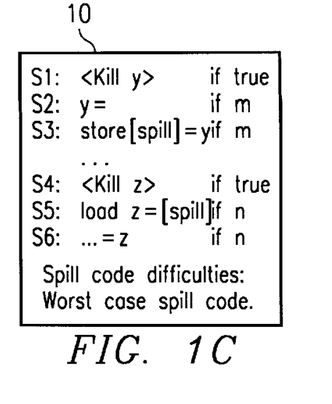
FIG. 1C illustrates a worst case spill code.

FIG. 1B shows the desired spill code for two instruction sequences shown in FIG. 1A operating in computer system 10. To allow coloring to progress after spilling, without predicate analysis and from the code stream alone, we must arrange for each component of the spilled live range to be definitely ended by an unpredicated definition. To this end we insert unpredicated kill pseudo-ops to mark the end of live ranges as shown in FIG. 1C operating in computer system 10.

Experimental Results. Several benchmarks from the SPECint-92 suite were compiled and the number of colors required for procedure-wide graph coloring register allocation with and without the teachings were recorded. In all, we compiled 1009 procedures and observed that 248 cases (24.6%) showed improved register allocation when using our invention. Of those cases which improved, the average improvement was a 20.71% decrease in the number of colors required. The standard deviation was 15.10%

Figure 12:
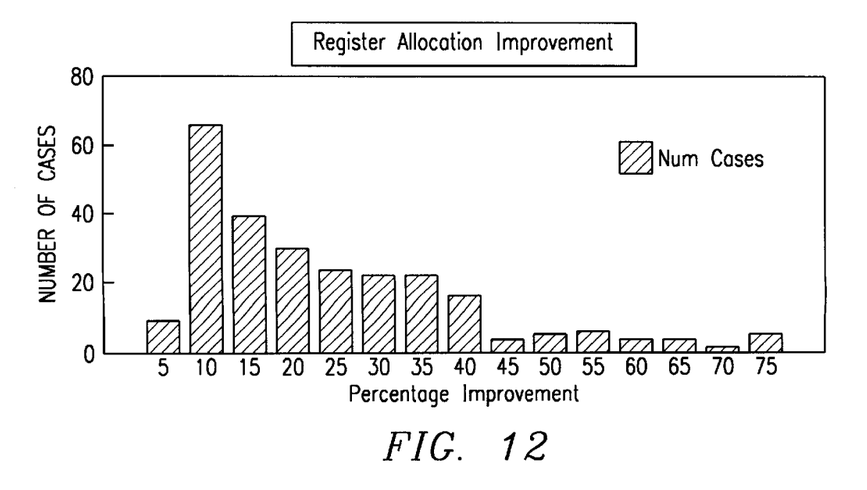
FIG. 12 illustrates one distribution of register allocation improvement.

FIG. 12 graphically depicts the distribution of improvement. While most procedures saw improvements in the 1.35%, range some procedures improved by as much as 75%. Some results of the experiments are shown in (4) below. The first column of (4) shows the name of the function compiled. The second column lists the number of colors required when using a traditional predicate-unaware graph coloring register allocator on the predicated code. The third column shows the number of colors required when using our predicate-aware register allocator. The fourth column shows the percentage of improvement.

4

| Function | Predicate-Unaware | Predicate-Aware | Improvement |
| --- | --- | --- | --- |
| set_dist | 30 | 9 | 70.00% |
| xlremprop | 18 | 4 | 69.23% |
| mv_reduce | 102 | 42 | 58.82% |
| massive_count | 101 | 44 | 56.44% |
| cdist | 32 | 14 | 56.25% |
| explode | 25 | 15 | 40.00% |
| map | 63 | 39 | 38.10% |
| tagblock | 19 | 12 | 36.84% |
| doprod | 22 | 14 | 36.36% |
| yyparse | 94 | 63 | 32.98% |
| sharp | 29 | 20 | 31.03% |
| opo_leaf | 31 | 22 | 29.01% |
| xlgo | 14 | 10 | 28.57% |
| sweep | 25 | 18 | 28.00% |
| closerow | 22 | 16 | 27.27% |
| rmcvd | 12 | 9 | 25.00% |
| opo | 45 | 34 | 24.44% |
| openrow | 29 | 22 | 24.14% |
| OpenConnection | 22 | 17 | 22.73% |
| printfile | 94 | 73 | 22.34% |
| xload | 18 | 14 | 22.22% |
| dobindings | 34 | 27 | 20.59% |
| duple | 25 | 20 | 20.00% |

While many procedures improved with our technique the majority did not. The dominant cause was absence of any predicated code in the procedure due to the simple nature of the if-converter. With a more aggressive if-conversion technique more programs would benefit from our work. Also, even when predicated code was present, it was sometimes of such simple form as to allow the predicate-unaware method to achieve good results.

Since graph coloring based register allocation is a heuristic approximation to an optional solution, we expected to see some cases which degraded simply due to the different structure of the interference graphs. That is, the heuristic approximation used to color the predicate-unaware interference graph could use fewer colors than the same heuristic approximation used to color the predicate-aware interference graph.

As the number of predicated live ranges increase in proportion to the number of unpredicated live ranges the impact of our inventive system and method should be even more beneficial. Furthermore, predicate-aware register allocation will be even more important when register pressure is increased by aggressive function inlining.

Although the present invention and its advantages have been described in detail, it should be understood that various changes, substitutions and alterations can be made herein without departing from the spirit and scope of the invention as defined by the appended claims.

What is claimed is:

1. A computer-implemented system for processing predicated code comprising:

means for scanning a block of predicated code and collecting a set of predicates used in the code to form a basis set;

means for allocating a bit-vector for each predicate in the basis set to form a live set, wherein each bit-vector represents a liveness with respect to each predicate; and means, controlled in part by the allocating means, for building an interference graph that symbolizes interferences between registers during allocation of registers.

2. The system of claim 1, further comprising:

means for augmenting the basis set of predicates with predicate p0, wherein p0 signifies an always true predicate.

3. The system of claim 1, wherein the means for allocating a bit-vector comprises:

means for updating the live set for liveness of a variable under a qualifying predicate QP.

4. The system of claim 3, wherein the means for updating the live set for liveness comprises:

means for determining whether variable X is live or dead, whereby X is live if guarded by QP and X is dead if not guarded by QP;

means for computing a minimal set of predicates from the basis set that encapsulate the liveness of X, if X is currently indicated as dead; and means for changing the bit-vector for each predicate in the minimal set to live.

5. The system of claim 1, wherein the means for allocating a bit-vector comprises:

means for updating the live set for deadness of a variable under the qualifying predicate QP.

6. The system of claim 5, wherein the means for updating deadness comprises:

means for determining whether variable X is live or dead, whereby X is live if guarded by QP and X is dead if not guarded by QP;

means for changing the bit-vector for QP to dead, if X is currently indicated as live; and means for forming a set of all predicates wherein X is currently live and remove QP from the set.

7. The system of claim 1, wherein the means for allocating a bit-vector comprises:

means for producing a set of all registers which are currently live under the qualifying predicate QP.

8. The system of claim 7, wherein the means for producing a set of registers comprises:

means for computing a single bit-vector which a union of all bit-vectors within the live set whose basis set predicates are not disjoint from QP.

9. The system of claim 1, further comprising:

means for augmenting each bit-vector with a set identifying tag.

10. The system of claim 1, wherein a plurality of blocks form a global region, the system further comprising:

means for recursively merging each basis set from each of the blocks in the plurality of blocks to form a single common basis set for the global region.

11. A computer-implemented method for processing predicated code, the method comprising the steps of:

scanning a block of predicated code and collecting a set of predicates used in the code to form a basis set;

allocating a bit-vector for each predicate in the basis set to form a live set, wherein each bit-vector represent a liveness with respect to each predicate; and building an interference graph that symbolizes interferences between registers during allocation of registers.

12. The method of claim 11, further comprising the step of:

augmenting the basis set of predicates with predicate p0, wherein p0 signifies an always true predicate.

13. The method of claim 11, wherein the step of allocating a bit-vector comprises the step of:

updating the live set for liveness of a variable under a qualifying predicate QP.

14. The method of claim 13, wherein the step of updating the live set for liveness comprises the steps of:

determining whether variable X is live or dead, whereby X is live if guarded by QP and X is dead if not guarded by QP;

computing a minimal set of predicates from the basis set that encapsulate the liveness of X, if X is currently indicated as dead; and changing the bit-vector for each predicate in the minimal set to live.

15. The method of claim 11, wherein the step of allocating a bit-vector comprises the step of:

updating the live set for deadness of a variable under the qualifying predicate QP.

16. The method of claim 15, wherein the step of updating deadness comprises the steps of:

determining whether variable X is live or dead, whereby X is live if guarded by QP and X is dead if not guarded by QP;

changing the bit-vector for QP to dead, if X is currently indicated as live; and forming a set of all predicates wherein X is currently live and remove QP from the set.

17. The method of claim 11, wherein the step of allocating a bit-vector comprises the step of:

producing a set of all registers which are currently live under the qualifying predicate QP.

18. The method of claim 17, wherein the step of producing a set of registers comprises the step of:

computing a single bit-vector which a union of all bit-vectors within the live set whose basis set predicates are not disjoint from QP.

19. The method of claim 11, further comprising the step of:

augmenting each bit-vector with a set identifying tag.

20. The method of claim 11, wherein a plurality of blocks form a global region, the method further comprising the step of:

recursively merging each basis set from each of the blocks in the plurality of blocks to form a single common basis set for the global region.

21. A computer-implemented system for processing predicated code that allows for the termination of unanalyzable live ranges, the system comprising:

means for scanning a block of predicated code and collecting a set of predicates used in the code to form a basis set;

means for allocating a bit-vector for each predicate in the basis set to form a live set, wherein each bit-vector represent a liveness with respect to each predicate; and means, controlled in part by the allocating means, for inserting an unpredicated kill command to terminate an unanalyzable live range.

22. A computer-implemented system for processing predicated code to form an interference graph that is utilized in the allocation of registers, the system comprising:

means for scanning a block of predicated code and collecting a set of predicates used in the code to form a basis set;

means for allocating a bit-vector for each predicate in the basis set to form a live set, wherein each bit-vector represent a liveness of each predicate; and means, controlled in part by the allocating means, for building an interference graph that symbolizes interferences between registers during allocation of registers.

23. The system of claim 22, wherein the means for allocating a bit-vector comprises:

means for updating the live set for liveness of a variable under a qualifying predicate QP.

24. The system of claim 23, wherein the means for updating the live set for liveness comprises:

means for determining whether variable X is live or dead, whereby X is live if guarded by QP and X is dead if not guarded by QP;

means for computing a minimal set of predicates from the basis set that encapsulate the liveness of X, if X is currently indicated as dead; and means for changing the bit-vector for each predicate in the minimal set to live.

25. The system of claim 22, wherein the means for allocating a bit-vector comprises:

means for updating the live set for deadness of a variable under the qualifying predicate QP.

26. The system of claim 25, wherein the means for updating deadness comprises:

means for determining whether variable X is live or dead, whereby X is live if guarded by QP and X is dead if not guarded by QP;

means for changing the bit-vector for QP to dead, if X is currently indicated as live; and means for forming a set of all predicates wherein X is currently live and remove QP from the set.

27. The system of claim 22, wherein the means for allocating a bit-vector comprises:

means for producing a set of all registers which are currently live under the qualifying predicate QP.

28. The system of claim 27, wherein the means for producing a set of registers comprises:

means for computing a single bit-vector which a union of all bit-vectors within the live set whose basis set predicates are not disjoint from QP.

29. A computer-implemented system for processing predicated code comprising:

means for scanning a block of predicated code and collecting a set of predicates used in the code to form a basis set;

means for allocating a bit-vector for each predicate in the basis set to form a flow set, wherein each bit-vector represents a flow value with respect to each predicate; and means, controlled in part by the allocating means, for analyzing flow values in the flow set to solve classical data flow problems.

* * * * *